United States Patent
Neudecker

(12) 
(10) Patent No.: US 6,282,668 B1
(45) Date of Patent: Aug. 28, 2001

(54) DATA BUS SYSTEM FOR MOTOR VEHICLES

(75) Inventor: Norbert Neudecker, Altfrauenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/058,354

(22) Filed: Apr. 10, 1998

(30) Foreign Application Priority Data

Apr. 10, 1997 (DE) .............................................. 197 14 937

(51) Int. Cl.$^7$ ...................................................... B06L 1/00
(52) U.S. Cl. ............................................ 713/324; 307/10.1
(58) Field of Search .................................. 713/300–340; 307/10.1, 9.1

(56) References Cited

U.S. PATENT DOCUMENTS

| | | | |
|---|---|---|---|
| 4,747,041 | * 5/1988 | Engel et al. ........................... | 713/324 |
| 5,081,586 | * 1/1992 | Barthel et al. ........................ | 701/49 |
| 5,151,855 | * 9/1992 | Gray et al. ............................ | 713/330 |
| 5,167,024 | * 11/1992 | Smith et al. .......................... | 713/323 |
| 5,175,845 | * 12/1992 | Little ..................................... | 713/323 |
| 5,196,728 | * 3/1993 | Jaux ..................................... | 307/10.1 |
| 5,216,674 | * 6/1993 | Peter et al. ............................. | 714/43 |
| 5,351,041 | * 9/1994 | Ikata et al. ....................... | 340/825.24 |
| 5,444,643 | * 8/1995 | Haussler et al. ..................... | 702/122 |
| 5,554,978 | 9/1996 | Sakagami et al. . | |
| 5,574,848 | * 11/1996 | Thomson ................................ | 714/2 |
| 5,581,556 | * 12/1996 | Ohie ..................................... | 370/431 |
| 5,598,039 | * 1/1997 | Weber ................................... | 307/38 |
| 5,621,250 | * 4/1997 | Kim ..................................... | 307/10.1 |
| 5,633,537 | * 5/1997 | Kurata et al. ......................... | 307/10.6 |
| 5,726,541 | * 3/1998 | Glenn et al. ............................ | 318/16 |
| 5,742,833 | * 4/1998 | Dea et al. .............................. | 713/323 |
| 5,744,874 | * 4/1998 | Yoshida et al. ...................... | 307/10.1 |
| 5,802,305 | * 9/1998 | McKaughan et al. ................ | 709/227 |
| 5,884,087 | * 3/1999 | White et al. ........................... | 713/310 |
| 5,892,893 | * 4/1999 | Hanf et al. .............................. | 714/3 |
| 5,991,887 | * 11/1999 | Ezell ..................................... | 713/340 |

FOREIGN PATENT DOCUMENTS

| | | |
|---|---|---|
| 43 05 219 | 8/1993 | (DE) . |
| 44 17 602 | 11/1994 | (DE) . |
| 44 25 485 | 1/1995 | (DE) . |
| 44 25 557 | 1/1995 | (DE) . |
| 44 06 999 | 9/1995 | (DE) . |
| 44 27 254 | 1/1996 | (DE) . |
| 19515194A1 | 4/1996 | (DE) . |
| 0443465A2 | 8/1991 | (EP) . |

OTHER PUBLICATIONS

Lawrenze, Wolfhard, Autobusses for sensor/actuator communication based on CAN–protocol, Automatisierungstechnische Praxis, 35, 1993, pp. 450–460.

\* cited by examiner

*Primary Examiner*—Paul R. Myers
(74) *Attorney, Agent, or Firm*—Crowell & Moring, L.L.P.

(57) ABSTRACT

A data bus system for motor vehicles with a number of electronic bus stations, each having an input port that is connected to the motor vehicle battery to supply power to the bus stations. Each bus station is equipped with a detector circuit and a controllable switch. Each bus station is turned off in the ground state when the ignition is turned off, with the exception of the detector circuit assigned to it, by positioning the controllable switch into an open position in a selective wake state. The controllable switch of each selected bus station is closed by its detector circuit while the temporarily required data exchange between selected bus stations takes place. At least one of the bus stations is defined as the main bus station to control the wake state.

8 Claims, 2 Drawing Sheets

DATA BUS SYSTEM FOR MOTOR VEHICLES

BACKGROUND AND SUMMARY OF THE INVENTION

This application claims the priority of German patent 197 14 937.5, filed Apr. 10, 1997, the disclosure of which is expressly incorporated by reference herein.

This invention relates to a data bus system for motor vehicles.

Data bus systems for data communication of this type are, for example, known from the controller area network (CAN), in particular from control devices in motor vehicles. The concept of communicating data in motor vehicles with the aid of a CAN, the function of the CAN, as well as a possible architecture of a CAN-module, are, for example, known from the BOSCH brochures "The Optimized Bus System for a Serial Data Transmission in Motor Vehicles," and also from "Functional Description," and "Architecture of the CAN-module AN 82526," dating from the year 1987. This known data bus system is constructed in a linear fashion. A number of electronic bus stations, in particular control devices of a motor vehicle, are connected to a data bus. In addition to the connection to the data bus, these bus stations can exhibit an additional input or output port to, for example, connect sensors and actuators or to connect to the power supply. This known data bus system operates in accordance with the multi-master principle, i.e., all bus stations have equal access. When the data bus is free, each bus stations can begin to transmit its data telegram. The telegram of a transmitting bus station is received by all bus stations and confirmed, but only analyzed by the bus stations that require the data of these telegrams.

However, other data bus systems of motor vehicles are known. Normally the bus stations of a data bus system of motor vehicles exhibit a power supply that is either turned off when the ignition is turned off and is only turned on by turning the ignition on (power supply via the so-called "binding post 15"), or one that exhibits a bus station power supply port which is inseparably connected to the motor vehicle battery, even when the ignition is turned off (Power supply over the so-called "binding post 30"). In the power supply system in accordance with the first alternative, data exchange between the bus stations, which could be required in certain situations, is not possible when the ignition is turned off, while the power supply system in accordance with the second alternative results in an undesirably high quiescent current usage.

A goal of the present invention is to create a data bus system in which the quiescent current is reduced to a minimum when the ignition is turned off, while still enabling necessary functions.

This and other goals have been achieved according to the present invention by providing a data bus system for a motor vehicle, comprising a plurality of electronic bus stations, each of said bus stations having an input port that is connected a battery of the motor vehicle to supply power to the bus stations, wherein each of said bus stations is equipped with a detector circuit and a controllable switch that turn off the supply of power to the bus station in a ground state when an ignition of the motor vehicle is turned off, with the exception of the detector circuit, by opening the switch, wherein during a temporarily required data exchange between selected ones of the bus stations, the controllable switch of each of said selected bus stations is closed by its detector circuit during a selective wake state, and wherein at least one of the bus stations is selected as a main bus station to control said wake state.

This and other goals have been achieved according to the present invention by providing a data bus system for a motor vehicle, comprising: a power supply which supplies power when an ignition of the motor vehicle is turned off, a plurality of electronic bus stations connected with each other via a data bus, each of the bus stations having a controllable switch which selectively connects the bus station to the power supply and disconnects the bus station from the power supply, each of said bus stations having a detector circuit connected to the power supply independently of the controllable switch, wherein when the ignition of the motor vehicle is turned off, the controllable switches disconnect the bus stations from the power supply until the detector circuits recognize that a data exchange is required between selected ones of the bus stations, at which time said detector circuits of said selected ones of the bus stations send a signal to said controllable switches of said selected ones of the bus stations to connect said selected ones of the bus stations to the power supply until said data exchange is completed, after which the controllable switches disconnect said selected ones of the bus stations from the power supply.

This and other goals have been achieved according to the present invention by providing a method of exchanging data in a data bus system for a motor vehicle, said method comprising the steps of: providing a power supply which supplies power when an ignition of the motor vehicle is turned off, connecting a plurality of electronic bus stations with each other via a data bus, providing each of the bus stations with a controllable switch which selectively connects each of the bus stations to the power supply and disconnects the bus station from the power supply, providing each of said bus stations with a detector circuit connected to the power supply independently of the controllable switch, wherein when the ignition of the motor vehicle is turned off, the controllable switches disconnect the bus stations from the power supply until the detector circuits recognize that a data exchange is required between selected ones of the bus stations, at which time said detector circuits of said selected ones of the bus stations send a signal to said controllable switches of said selected ones of the bus stations to connect said selected ones of the bus stations to the power supply until said data exchange is completed, after which the controllable switches disconnect said selected ones of the bus stations from the power supply.

The fundamental idea of the invention lies in the creation of a selective wake state when the ignition is turned off, enabling an intermittent data exchange between selected bus stations that are each assigned to certain necessary functions. In accordance with the invention, the bus stations are therefore normally disconnected from the power supply when the ignition is turned off (i.e., bus stations are in a sleep state) and are only briefly turned on or supplied with voltage during the temporarily required data exchange between selected bus stations (i.e., bus stations are in a wake state). For this, at least one bus station is defined as the main bus station in order to control the respective wake state, although in principle the bus stations can have equal access. In order to realize the selective wake state, the bus stations have to exhibit an added feature in the form of a detector circuit that is supplied with current, even when the bus station is turned off. However, since only the detector circuits have to be supplied with current, the quiescent current usage is reduced to a minimum since the power supply is always turned off from the bus stations. The detector circuit can thereby be integrated into the hardware of the bus station or be connected externally to the bus station. The detector circuit of a main bus station can furthermore differ from the detector circuits of the remaining bus stations. In addition, all bus stations can be main bus stations in the sense that they can control a selective wake state. A main bus station can either be awakened by an external wake input (interrupt input) or can wake itself, for example, by a real time clock connected to the detector circuit.

As a further development of the invention, the main bus station exhibits a circuit that sends a selection telegram to the data bus by which each temporarily required data exchange between selected bus stations can be determined in order to activate a necessary data exchange. In a storage device of the main bus station, for example its microprocessor or in its detector circuit, information is stored as to when and, if needed, how long a data exchange is necessary, and which bus stations are to be selected for each necessary data exchange. The main bus station can therefore also be a selected bus station.

In another advantageous embodiment of the present invention, the detector circuits of all bus stations receive the selection telegram in order to determine whether the bus station assigned to them is selected, and only when this occurs turn the power supply on. The process of turning the power off occurs, for example, in the main bus station, in particular by turning off all bus telegrams or by issuing a dominant bus signal, for example by over-writing an existing transmission with a long high level. In known bus systems (CAN, for example) the bus stations recognize that it usually deals with a bus protocol violation in the second variation, upon which they terminate their transmission.

In addition, not only detector circuits, but also the controllable switches for turning the power supply on and off may either be integrated in the respective bus stations or may be externally connected to the respective bus stations. The connection to the controllable switch in the detector circuit exterior of the bus stations has the advantage that data bus systems already available can be upgraded without changing the bus stations. However, in principle an integration of the detector circuit and the controllable switch into the bus stations housing is preferred.

Other objects, advantages and novel features of the present invention will become apparent from the following detailed description of the invention when considered in conjunction with the accompanying drawings.

DETAILED DESCRIPTION OF THE DRAWINGS

Figure 1:
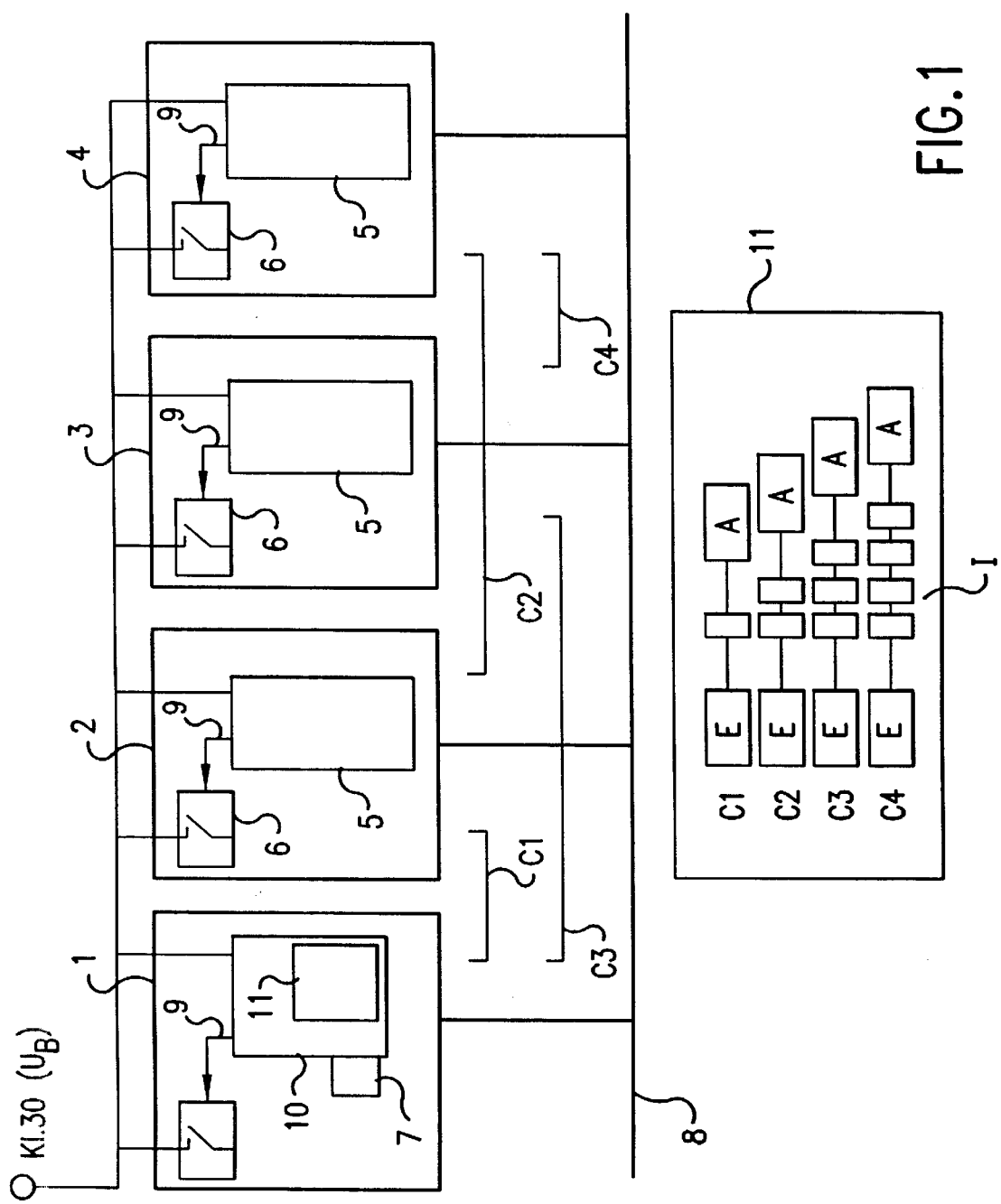
FIG. 1 is a schematic view of a data bus system according to a preferred embodiment of the present invention.

In FIG. 1, the bus stations 1, 2, 3, and 4 are connected to the data bus 8. Bus station 1 is defined as the main bus station in the illustrated example. Bus stations 2, 3, and 4 exhibit a detector circuit 5 that is different from the detector circuit 10 of the main bus station 1. The detector circuit 10 of the main bus station 1 exhibits, in addition to the general design of the detector circuits 5 of the remaining bus stations 2, 3, and 4, a circuit 11 by which the selection telegram (C1 to C4) can be sent to the bus. The detector circuit 10 of the main bus station 1 exhibits a real-time clock 7 for the timing control of the selective wake state. It, in turn, first wakes the main bus station 1 or its microprocessor ($\mu$P) (not displayed here). The storage device of the main bus station ($\mu$P) stores information as to when and how long a temporary required data exchange is to be executed, and which bus stations have to be selected for the respective data exchange. A data exchange C1 between the main bus station 1 and bus station 2, a data exchange C2 between bus station 2 and bus station 4, a data exchange C3 between main bus station 1 and bus station 3, and a data exchange C4 between bus 0 station 3 and bus station 4 are, for example, to be executed briefly. For each necessary data exchange C1 to C4, a corresponding selection telegram, stored in the storage device of the main bus station 1, is transmitted from the main bus station 1 to the data bus 8 in order to activate the respective necessary data exchange.

In addition, it is noted that the detector circuit 10 can alternatively exhibit an external interrupt input port (not displayed here) by which the switch 6 of the main bus station 1 can also be closed. The turning-off process again occurs from the main bus station 1 itself which is awakened by closing the switch 6. Several or all bus stations 1, 2, 3, 4 can furthermore be equipped with a detector circuit 10, functionally upgraded with respect to the detector circuit 5, if several or all bus stations are to be main bus stations or to control a selective wake state.

The detector circuit 10 can, for example, also contain a programmable storage device, wherein information can be stored as to what number of impulses I the respective detector circuit is to react to.

The detector circuits 5 and 10 are connected to the power supply via the binding post 30 of the motor vehicle, which is typically provided as the power supply to the battery voltage $U_B$, using a direct connection to the battery.

If the detector circuits 5 and/or 10 of the bus stations 1, 2, 3, and/or 4 recognize that they have been selected for a necessary data exchange, in particular because of the received selection telegram, each detector circuit respectively assigned to the selected bus stations actuates a controllable switch 6 via the output port 9 in order to connect the entire bus station with the battery voltage $U_B$ via the binding post 30 to supply power. If the detector circuit 5 or 10 is integrated into the bus stations 1, 2, 3, and 4, as in the illustrated example, the power supply system of the bus station via the controllable switch 6 corresponds to the power supply system of the bus station with the exception of the detector circuit, since it is already continuously supplied with power.

Figure 2:
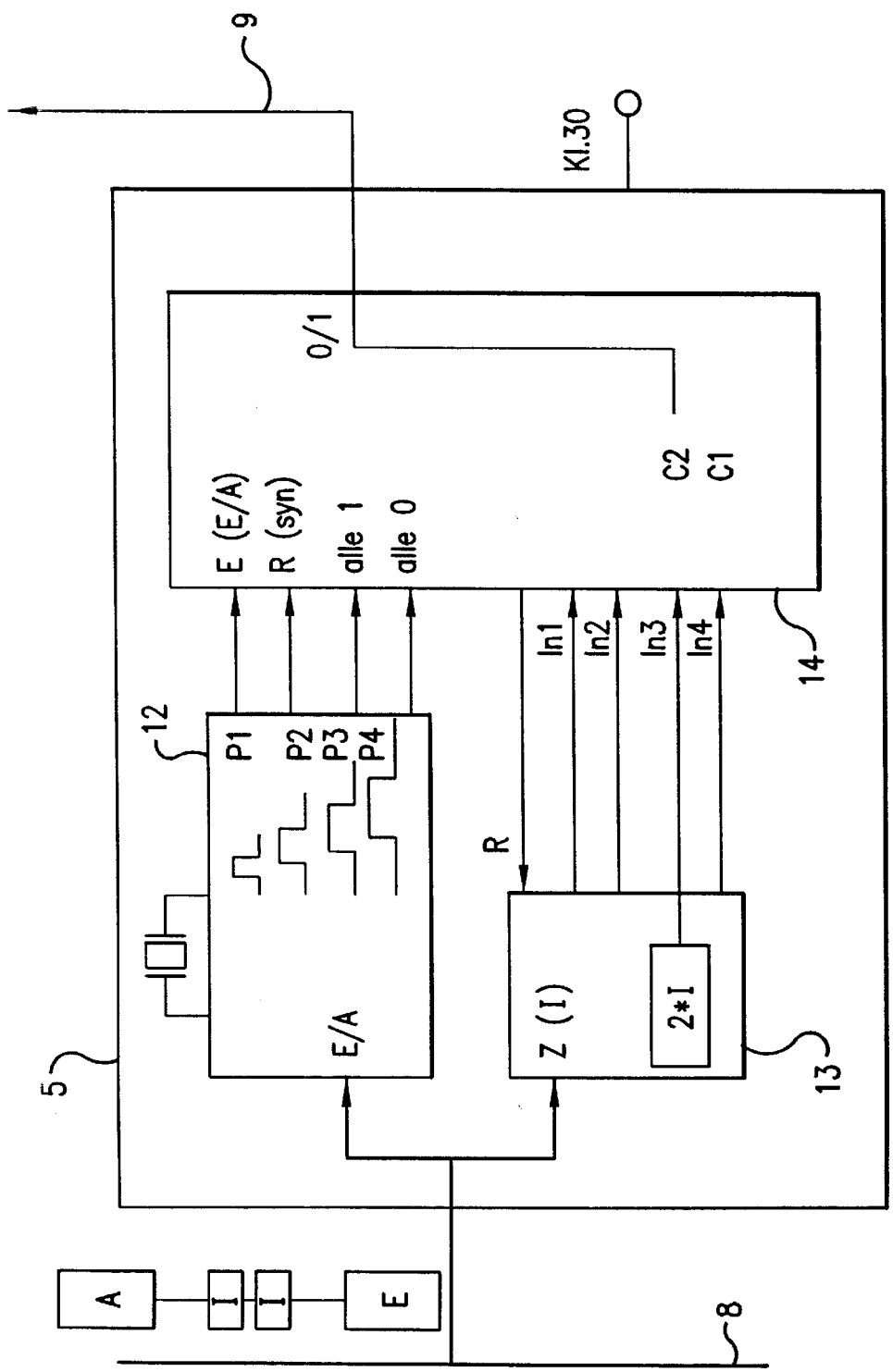
FIG. 2 is a schematic view of a detector circuit of a bus station of the data bus system of FIG. 1 that is not the main bus station.

The duration of closing the controllable switch 6 in the selective wake state is, for example, also controlled from the main bus station 1. However, it is possible that the duration of the controllable switch 6 closing is preset within the respectively selected bus stations after activation. FIG. 2 illustrates, using the example of the data exchange C2 between bus stations 2 and 4, the design and functionality of a detector circuit to recognize whether the bus station assigned to it is the bus station selected for the selected data exchange.

The elements of the drawing in FIG. 2, identical to the ones in FIG. 1, are listed with the same reference symbols. In FIG. 2, the detector circuit 5 shall be the detector circuit of bus station 2.

The selection telegram, for example those that are assigned to the data exchange C2, begins with a long initial impulse E, followed by two short code impulses I, and ends with a long final impulse A. While all selection telegrams for each data exchange C1 to C4 begin with a long initial impulse E and end with the long final impulse A, the number of short code impulses I between impulse E and impulse A corresponds to the data exchange required at that moment.

Hence, if the main bus station 1 recognizes that data exchange C2 is to be activated next, the selection telegram for the data exchange C2 is called from the data storage device of its microprocessor (μP) and transmitted via circuit 11, integrated in the detector unit 10 of the illustrated example, to the data bus 8. This selection telegram transmitted to the data bus 8 is received from the detector circuits 5 and 10 of bus stations 1 to 4, which is then analyzed. For this, the selection telegram is the input signal of an oscillator 12 as well as that of a counter 13 in the detector circuit 5 (or 10). The oscillator 12 filters out the short code impulses I. Due to the long initial impulse E, a short impulse P1 is respectively transmitted from oscillator 12 to the input port R(E/A) of the switch control 14. The impulse P1 actuates the switch control 14 to send a reset signal R that is transmitted to the counter 13. Following the reset signal R, issued by the long initial impulse E, the counter 13 begins to count the short code impulses I that follow this reset signal R until the long final impulse A concludes the counting process.

If for example, as in the data exchange C2 of the illustrated case, the sequence of two short code impulses I is captured, the counter 13 transmits this counter reading to the input ports ln1 to ln4 of the switch control 14. The data exchange C2 is recognized by the corresponding counter reading located at these input ports of the switch control 14, and, as a result, the output port 9 of the detector circuit 5 is actuated such that the controllable switch 6 is closed.

The process of turning off the active bus stations either occurs automatically after time has elapsed (timeout) or via the main bus station 1, and can for example be done by sending out a long impulse E which also executes a reset of the counters, thereby also resetting the output port 9, whereby the switch 6 is opened again.

Since the detector circuit 5 of bus station 2 in FIG. 2 is illustrated as an example of one that is the selected bus station for a data exchange C1 and C2, the output port 9 is activated at the input ports ln1 to ln4 of the switch control 14 to close the controllable switch 6 with the counter readings (C1: one code impulse I, C2: two code impulses I), resulting from the number of short code impulses of the selection telegrams for C1 and C2. If, for example, the counter 13 recognizes 4 short code impulses I during a requested data exchange, it would not lead to the activation of output port 9, resulting in the controllable switch 6 remaining open.

The detector circuit 5 in accordance with FIG. 2 is constructed entirely by using hardware modules: in the illustrated example, the detector circuit is preferably constructed with oscillator 12, which can be a MC14060 module, a counter 13, which can be a MC74HC393 module, and a switch control 14, which can be an ispGAL22V10C module. The detector circuit can also be integrated on a chip, preferably using CMOS technology, since it is the most suited with respect to saving electricity. In addition, a bus- (for example CAN-) transceiver can be integrated on the chip since it has to be continuously supplied with current as well.

After activating the data exchange, the main bus station 1 can still monitor the data exchange between other selected bus stations in order to engage itself in a corrective manner should an error occur. A monitoring function of this type by the main bus station 1 can also be executed selectively, if, for example, a certain data exchange, for example C4, is charged with a function that is critical for the safety.

The output ports P2, P3, or P4 of the oscillator 12 can be activated to trigger preset error processing functions, in particular when an error has been recognized. It can, for example, be determined by the main bus station 1, that the selection telegram is being analyzed by the bus stations 2 to 4 in an asynchronic manner since, for example, a long final impulse A was erroneously recognized as a long first impulse E. In this case, a longer impulse with respect to impulses E and A (for example, by a factor of 2) can be transmitted by the main bus station 1, upon which the output port P2 of the oscillator 12 or the input port R(syn) of the switch control 14 are activated. A synchronized reset signal R is sent out to the counters 13 of all selected bus stations. Thus a synchronization of the bus stations to the first long impulse E takes place.

With the aid of the main bus station 1, it is further possible to recognize an error in which it would be necessary to turn all bus stations on, upon which another error signal of the oscillator 12 output port P3 or of the input port "all 1" of the switch control 14 can be activated, causing all output ports 9 of all bus stations to turn on the controllable switches 6.

If the main bus station 1 recognizes an error in which it would be advantageous for all bus stations to be turned off, the output port P4 of the oscillator 12 is activated via another signal through the data bus 8 in order to deactivate the output ports 9 of all bus stations 1 to 4 via the input port "all 0," of the switch control 14, so that no controllable switch 6 is closed.

When all controllable switches 6 are opened, it corresponds to the ground state when the ignition is turned off, whereby the quiescent current usage is minimized in the motor vehicle. The quiescent current usage is only raised slightly in a selective wake state when these selected bus stations are briefly turn on and then off again. This ensures that the necessary functions of a motor vehicle can be executed when the ignition is turned off.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A data bus system for a motor vehicle, comprising a plurality of electronic bus stations, each of said bus stations having an input port that is connected with a battery of the motor vehicle to supply power to the bus stations, wherein each of said bus stations is equipped with a detector circuit and a controllable switch that turn off the supply of power to a portion of the bus station in a ground state when an ignition of the motor vehicle is turned off by opening the switch, wherein power is continuously supplied to said detector circuit, wherein, during a temporarily required data exchange between selected ones of the bus stations, the controllable switch of each of said selected bus stations is closed by it's detector circuit during a selective wake state, and wherein at least one of the bus stations is selected as a main bus station to control said wake state.

2. A data bus system according to claim 1, wherein the controllable switch of the main bus station is initially turned on by a control signal of an external or internal additional circuit to control said wake state.

3. A data bus system according to claim 1, wherein the main bus station includes a circuit by which each said temporarily required data exchange between selected bus stations can be preset in the form of a selection telegram to be transmitted to the data bus, and a storage device, in which the selection telegrams are stored.

4. A data bus system according to claim 2, wherein the main bus station includes a circuit by which each said temporarily required data exchange between selected bus stations can be preset in the form of a selection telegram to be transmitted to the data bus, and a storage device, in which the selection telegrams are stored.

5. A data bus system according to claim 3, wherein the main bus station transmits the selection telegram to the data bus, said selection telegram being received and analyzed by the detector circuits of at least the remaining bus stations, to activate said required data exchange between said selected bus stations, wherein only said selected bus stations close their controllable switches.

6. A data bus system according to claim 4, wherein the main bus station transmits the selection telegram to the data bus, said selection telegram being received and analyzed by the detector circuits of at least the remaining bus stations, to activate said required data exchange between said selected bus stations, wherein only said selected bus stations close their controllable switches.

7. A data bus system for a motor vehicle, comprising:
 a power supply which supplies power when an ignition of the motor vehicle is turned off,
 a plurality of electronic bus stations connected with each other via a data bus,
 each of the bus stations having a controllable switch which selectively connects the bus station to the power supply and disconnects the bus station from the power supply,
 each of said bus stations having a detector circuit connected to the power supply independently of the controllable switch,
 wherein when the ignition of the motor vehicle is turned off, the controllable switches disconnect the bus stations from the power supply until the detector circuits recognize that a data exchange is required between selected ones of the bus stations, at which time said detector circuits of said selected ones of the bus stations send a signal to said controllable switches of said selected ones of the bus stations to connect said selected ones of the bus stations to the power supply until said data exchange is completed, after which the controllable switches disconnect said selected ones of the bus stations from the power supply.

8. A method of exchanging data in a data bus system for a motor vehicle, said method comprising the steps of:
 providing a power supply which supplies power when an ignition of the motor vehicle is turned off,
 connecting a plurality of electronic bus stations with each other via a data bus,
 providing each of the bus stations with a controllable switch which selectively connects each of the bus stations to the power supply and disconnects the bus station from the power supply,
 providing each of said bus stations with a detector circuit connected to the power supply independently of the controllable switch,
 wherein when the ignition of the motor vehicle is turned off, the controllable switches disconnect the bus stations from the power supply until the detector circuits recognize that a data exchange is required between selected ones of the bus stations, at which time said detector circuits of said selected ones of the bus stations send a signal to said controllable switches of said selected ones of the bus stations to connect said selected ones of the bus stations to the power supply until said data exchange is completed, after which the controllable switches disconnect said selected ones of the bus stations from the power supply.

* * * * *